United States Patent [19]
Hubbard et al.

[11] 3,714,767
[45] Feb. 6, 1973

[54] CROP HARVESTER

[75] Inventors: Arthur Lowell Hubbard; Leon Franklin Sanderson, both of Des Moines, Iowa

[73] Assignee: Deere & Company, Moline, Ill.

[22] Filed: June 9, 1971

[21] Appl. No.: 151,424

[52] U.S. Cl. .............................. 56/208, 56/DIG. 15
[51] Int. Cl. ........................................... A01d 67/00
[58] Field of Search ....... 56/14.2, 10.2, DIG. 15, 208, 56/210

[56] References Cited

UNITED STATES PATENTS

| | | |
|---|---|---|
| 3,402,540 | 9/1968 | Karlsson et al. .................... 56/208 |
| 3,196,599 | 7/1965 | Meiners et al. .................. 56/DIG. 15 |

Primary Examiner—Antonio F. Guida
Attorney—H. Vincent Harsha, Harold M. Knoth, William A. Murray, John M. Nolan, Raymond L. Hollister, Jimmie R. Oaks and John O. Hayes

[57] ABSTRACT

A hydraulically-operated vertical positioning mechanism for a crop harvester that is pivotally mounted on a frame for vertical swinging movement comprising a pair of rigidly-joined and axially-aligned pistons and cylinders that extend between the frame and unit, a ground feeler on the unit operates a valve for one of the pistons and cylinders and a linkage connected to the piston and cylinder and responsive to adjustment of the latter operates a control valve for the other piston and cylinder.

7 Claims, 7 Drawing Figures

INVENTORS
A. L. HUBBARD
L. F. SANDERSON

CROP HARVESTER

BACKGROUND OF THE INVENTION

It has heretofore been known to provide a crop-treating unit that is supported on a main mobile frame and which has a crop inlet at its forward end. It has also heretofore been known to provide transverse frame structure adjacent the forward end of the crop-treating unit which supports, generally in cantilever fashion, a number of harvester row units. Provision is provided for the row units to be adjusted transversely along the beam structure so as to accommodate different spacings between the rows.

For cotton harvesters, there is normally provided a forward pair of row units that are rockably supported on the main frame so that they may be vertically moved in accordance with various characteristics of the ground and crop. Also, on the more conventional-type cotton harvesters, ground feelers are provided on each of the row-harvesting units which automatically adjust the height of the row units in accordance with the ground characteristics. Drive mechanism for the harvesting mechanisms in the row units are normally self-adjusting by way of telescoping shafts so that raising and lowering of the units does not interrupt the transmission of power of the main power source of the unit to the individual row units.

It has also heretofore been known to provide sensing mechanisms on row units that include ground-engaging feelers hydraulically attached to hydraulic lift mechanisms and which operate to raise and lower the respective row units in accordance with the rise and fall of the ground surface.

Conventionally, particularly in corn harvesters, there has normally been provided row units which feed rearwardly into a transverse auger. However, in almost all instances, the row units are fixed to move vertically with the auger since the horizontal pivot for both the transverse auger and the row units is rearwardly of the auger and the hydraulic units that are provided for lifting the unit lifts both the auger and the row units. This requires considerable power to lift the entire system of auger and conveyor system as well as the row units. Also, by providing such a conventional system, the individual row units are not adjusted individually, but both must rise and fall in accordance with the dictates of the sensing mechanism of one of the units.

SUMMARY OF THE INVENTION

With the above in mind, it is the primary object of the present invention to provide a crop harvester in which there is a main tractor or frame that carries a crop-treating mechanism. The crop-treating mechanism includes a transverse auger which serves as part of the inlet to the treating mechanism. In the particular type of structure shown and described, the treating mechanism is a chamber in which air moves and which separates and cleans ripe cotton bolls from a mixture of ripe and green bolls. Also provided on the basic structure adjacent the transverse auger is a transverse shaft mechanism, part of which rotates about a transverse axis. Supported for vertical movement on the nonrotative part of the transverse shaft structure are forwardly projecting row units. The rotatable portion of the shaft structure is drivingly connected to the harvesting mechanism of each of the row units. Consequently, as the individual row units rock about the pivot of the shaft structure, the drive mechanism is not affected since it is connected by rotary means or gears that are fixed to the shaft structure.

It is also an object of the present invention to provide height-sensing and adjusting mechanism for each of the row units. The basic means of raising and lowering the row units are hydraulic cylinders extending between the frame and the row units. Feeler or ground-engaging shoes are supported on each of the row units. The individual row units are also supported on the transverse pivots by hydraulic cylinders which may extend or retract to raise and lower the units on the pivots. The shoes are interconnected to the cylinders by control means. The shoes adjust the control means in accordance with the ground characteristics so as to automatically extend and retract the cylinders. The control means that are controlled by the ground shoes will move the respective units within a range of vertical movement. However, upon moving the units beyond a predetermined range, a second control means operates the hydraulic cylinders to raise and lower the row units to and from transport positions.

BRIEF DESCRIPTION OF THE DRAWINGS

FIG. 7 is an enlarged view of the upper portions of the height-sensing linkage.

DESCRIPTION OF THE PREFERRED EMBODIMENT

Figure 1:
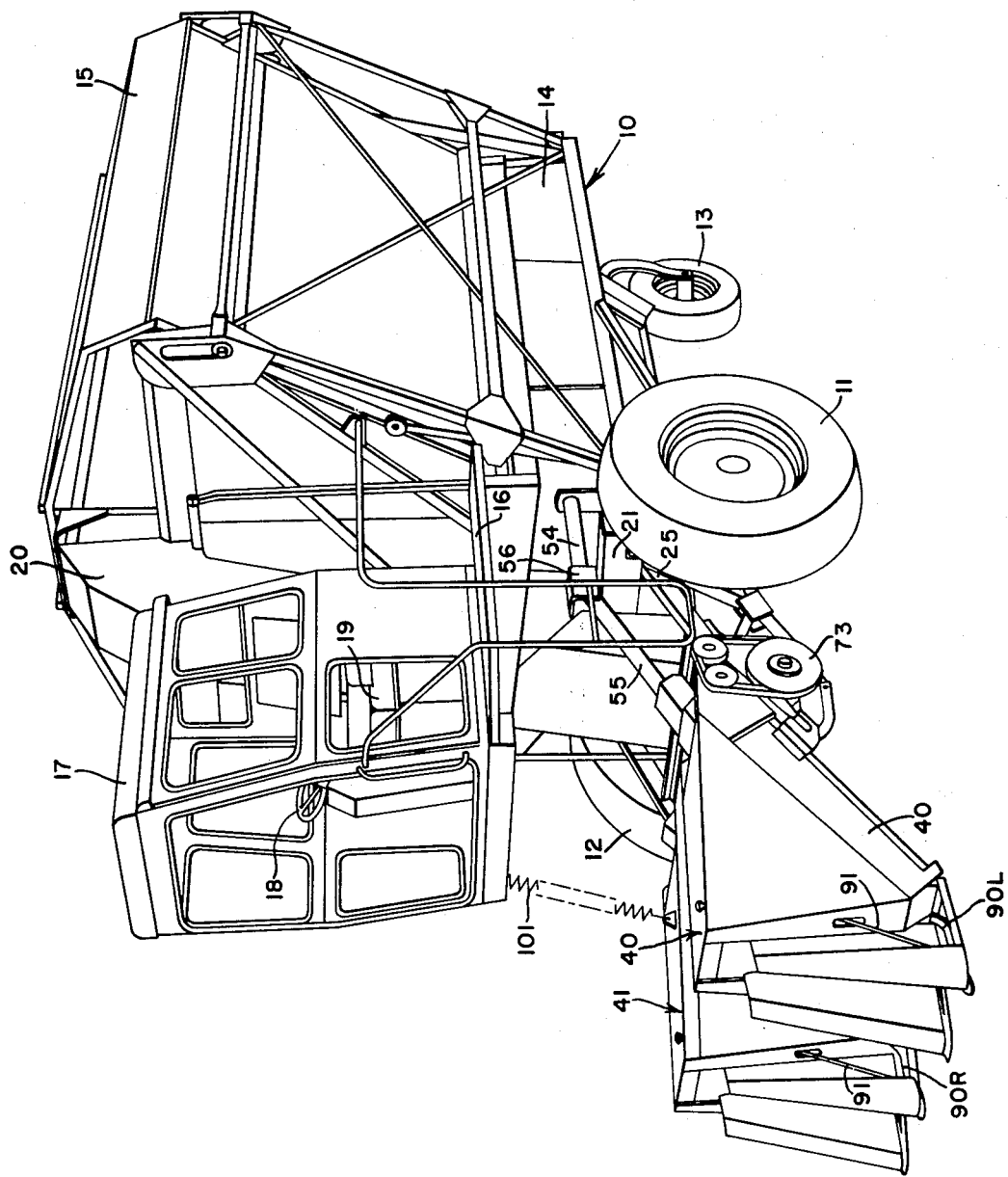
FIG. 1 is a front and side perspective view of the entire harvesting unit.

Referring first to FIG. 1, the harvester includes a basic tractor or frame 10 having front traction wheels 11, 12 and a rear steerable wheel 13. The tractor 10 has a main power source or engine 14 and carries a large material- or cotton-receiving basket 15 thereon. Forward of the basket 15 is an operator's platform 16 that includes a cab 17, steering mechanism 18 and a seat 19. The platform 16 has a rear opening therein and the cab 17 is faced forwardly of the front wall of the basket 15 to permit passage of a large material-conveying duct 20 that discharges into the basket 15. The lower end of the duct 20 contains a material-treating unit, which in the particular instance operates to separate ripe from green bolls and heavier trash that is harvested with the ripe and green bolls. While this type of crop-treating system is shown, it should be recognized that other types of crop-treating systems or mechanisms could be used such as, for example, a driven type of boll cleaner and trash separator. Extending between the front traction wheels 11, 12 is a main U-shaped frame structure that includes a horizontal section 21 positioned just to the rear of the lower end of the duct 20, and a pair of depending sections, one of which is shown partially at 22 having their lower ends connected to the respective wheels 11, 12. The frame structure also includes upper and lower forwardly projecting brackets 23, 24 on which is carried, at opposite sides of the tractor, forwardly projecting framework on which the harvesting units are connected. Extending forwardly from the respective brackets 23, 24 on each of the vertical frame members 22 are side frame structures composed of an upper inclined beam 25 and a lower horizontal beam 26, both of which have their rear ends pinned to the brackets 23, 24. The upper beam 25 projects forwardly and is welded to a main transverse beam 27 that extends transversely across the forward end of the tractor and is rigidly connected to the similar side frame structure on the opposite side. The lower beam 26 extends forwardly and is welded to a pair of plates 28. The pair of plates 28 also have welded to their inner surfaces a diagonal brace 29 and an upwardly and forwardly inclined brace 30 that has its upper forward end welded to the underside of the beam 27. Extending upwardly and forwardly from the transverse beam 27 are brackets 35 that carry shaft portions or tubes, there being one 36 at each end and an elongated central one 37. The shafts or tubes 36, 37 are transversely axially aligned and are transversely spaced apart.

Left- and right-hand harvesting units 40, 41 are provided forwardly of the operator's station and of the beam 27. Each unit 40, 41 has rearwardly projecting vertical side walls 42, 43 that are reinforced at their rearwardmost portion. The rearwardmost portion has openings therein to receive the respective tubes or shaft portions 36, 37. This can thus be seen in FIG. 3. Each of the units 40, 41 have rear upright walls 46 on which is fixed gear casings 47. The casings support and journal a transverse elongated main drive shaft 48 concentrically with the tubes 36, 37 and have internal bevel gears 49 fixed to exposed portions of the shaft between the tubes. The left casing has a main bevel drive gear 50 and a bevel-driven gear 51 fixed to a short stub shaft 52 extending forwardly of the casing 47. The right casing 47 has a similar bevel-driven gear 51 and a driven shaft 52 projecting forwardly of the casing. Reviewing FIG. 4, power to drive the bevel gear 50 is received from the main power source or engine 14 through a fan drive, indicated in its entirety by the reference numeral 53 that drives fore-and-aft extending shafts 54, 55 that are interconnected by a U-joint 56. A second U-joint 57 is just rearwardly of the casing 47 and connects to the main bevel drive gear 50. The engine 14 also drives a tractor transmission 60 having a manual control 61 associated therewith. Thus, by reviewing FIG. 4, it becomes apparent that the entire harvesting mechanism is driven independently of the speed of the tractor and without regard to the speed of the tractor.

Mounted on the respective shaft portions 36, 37 and adjacent the respective wall extensions 42, 43 are U-shaped clamps 63 that have bolts 64 extending through opposite legs of the straps 63. By providing straps 63 and their bolts 64 alongside the respective plates 42, 43, the harvesting units 40, 41 may be locked in various transverse positions along the shaft portions 36, 37. Since the transmissions 47 may be moved along the shafts 48, which are concentric with the shaft portions 36, 37, the entire units 40, 41 may be shifted transversely without interrupting or changing the basic drive mechanism.

Figure 5:
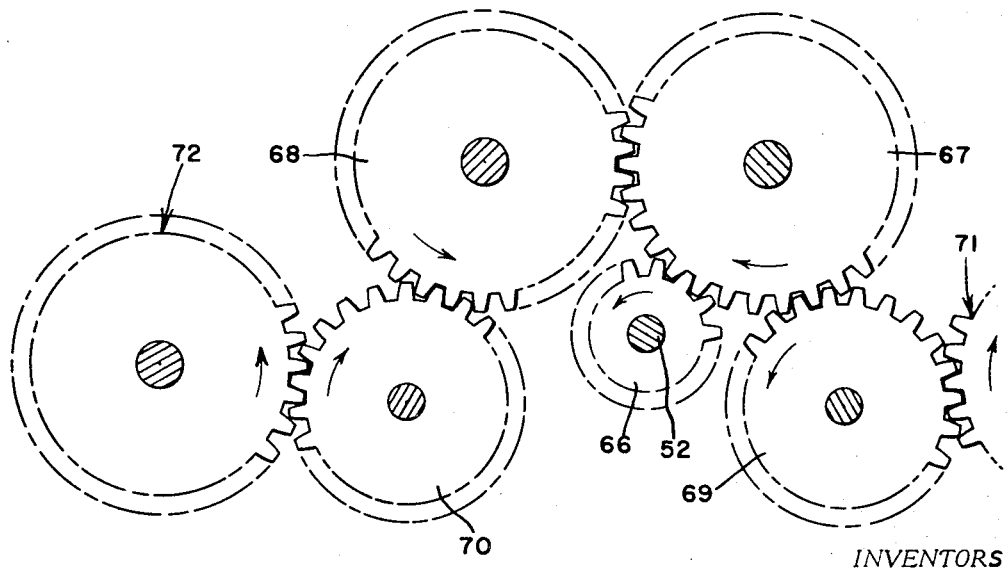
FIG. 5 is a sectional view taken along the line 5—5 of FIG. 2.
Figure 4:
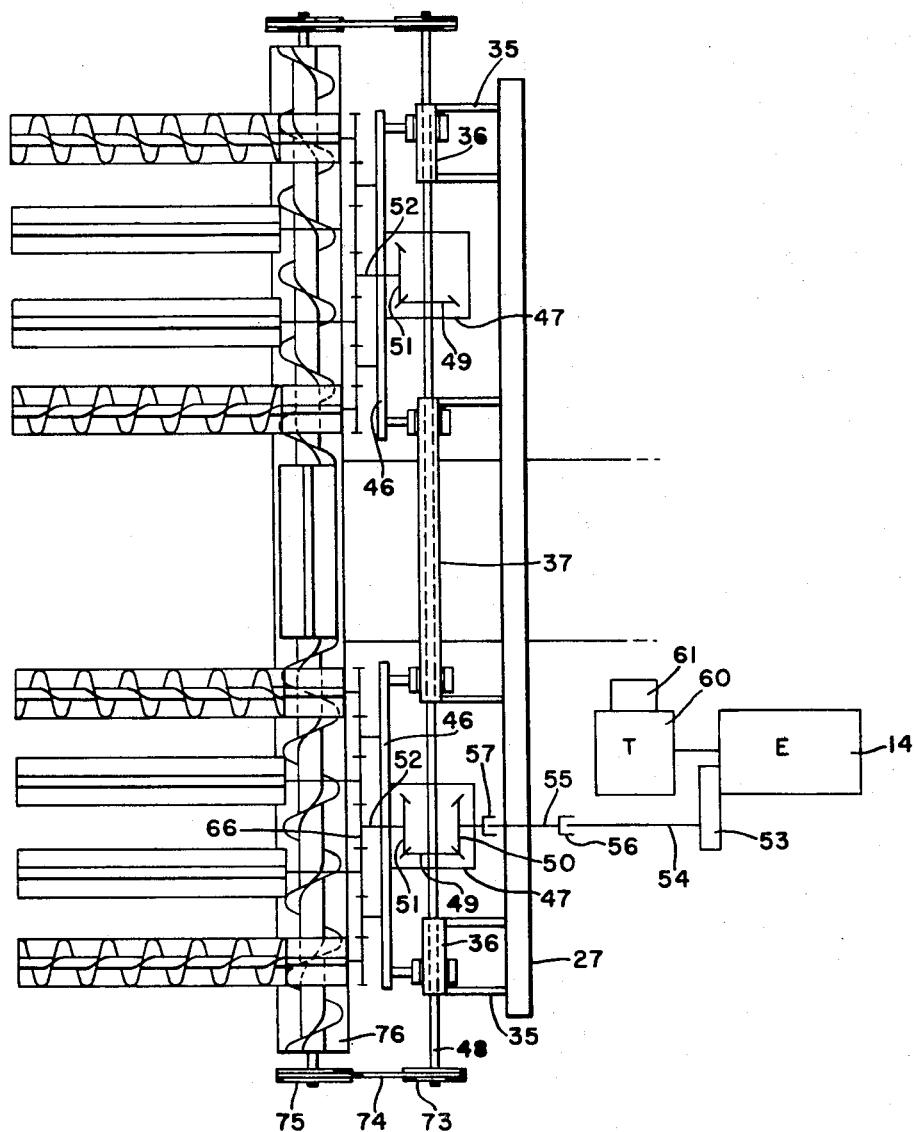
FIG. 4 is a schematic view of the drive mechanism between the main power source and the row units.

Referring now to FIGS. 4 and 5, the shaft 52 penetrates through the wall 46 and has fixed thereto a spur gear 66 which drives a brush gear 67 that is enmeshed with its opposite brush gear 68. The brush gears mesh with idler gears 69, 70 respectively, which in turn drive the left- and right-hand auger gears 71, 72. Also, fixed to the left-hand end of the main drive shaft 48 is a pulley 73 which drives through a belt 74 and auger pulley 75 that is mounted on the auger drive shaft of transverse auger 78 seated in an auger trough 76.

Means for rocking the harvesting units 40, 41 about the transverse axis of the tubes or shaft portions 36, 37 are provided by means of extensible and retractable hydraulic power units 80L, 80R, each having a large cylindrical end 81 and a small cylindrical end 82, the two ends being separated by a wall 83. Contained in each of the rear large cylinders is a piston 84 that has its rod projecting rearwardly therefrom and pivotally connected at 85 to the plates 28. The forward or small cylinder 82 has a piston 86 with a rod extending forwardly and pivotally connected to the respective row unit 40 or 41 at 87 on the underside and beneath the transverse auger tube 76. The auger housing 76 is fixed with the transverse beam 27 by means of transversely-spaced bracket structure 77. As may be seen from viewing the various figures, the transverse auger structure 78 in the auger housing 76 is a forward extension of the crop-treating unit 20 and, in fact, serves as a transverse upwardly opening inlet for the crop-treating unit. The auger structure 78 itself is composed of a pair of transverse augers behind the units 40, 41 that receives cotton from the units and feeds it inwardly to a central beater or paddle structure that drives it rearwardly into the crop-treating unit 20.

Pivoted to move vertically from the forward end of units 40, 41 are shoes or ground feelers 90L for the unit 40 and 90R for the unit 41. Each shoe has a rod 91 with a turnbuckle adjustment therein that extends from the respective shoe 90L, 90R upwardly to a variable restrictor valve, 92L for the left unit 40 and 92R for the right unit 41. The exact details of the restrictor valves 92L, 92R are not of particular importance relative to the present invention other than to recognize that they are low-capacity valves. If such details are needed, such may be had by reference to a copending application Ser. No. 83,769 filed on 26 October, 1970.

Figure 6:
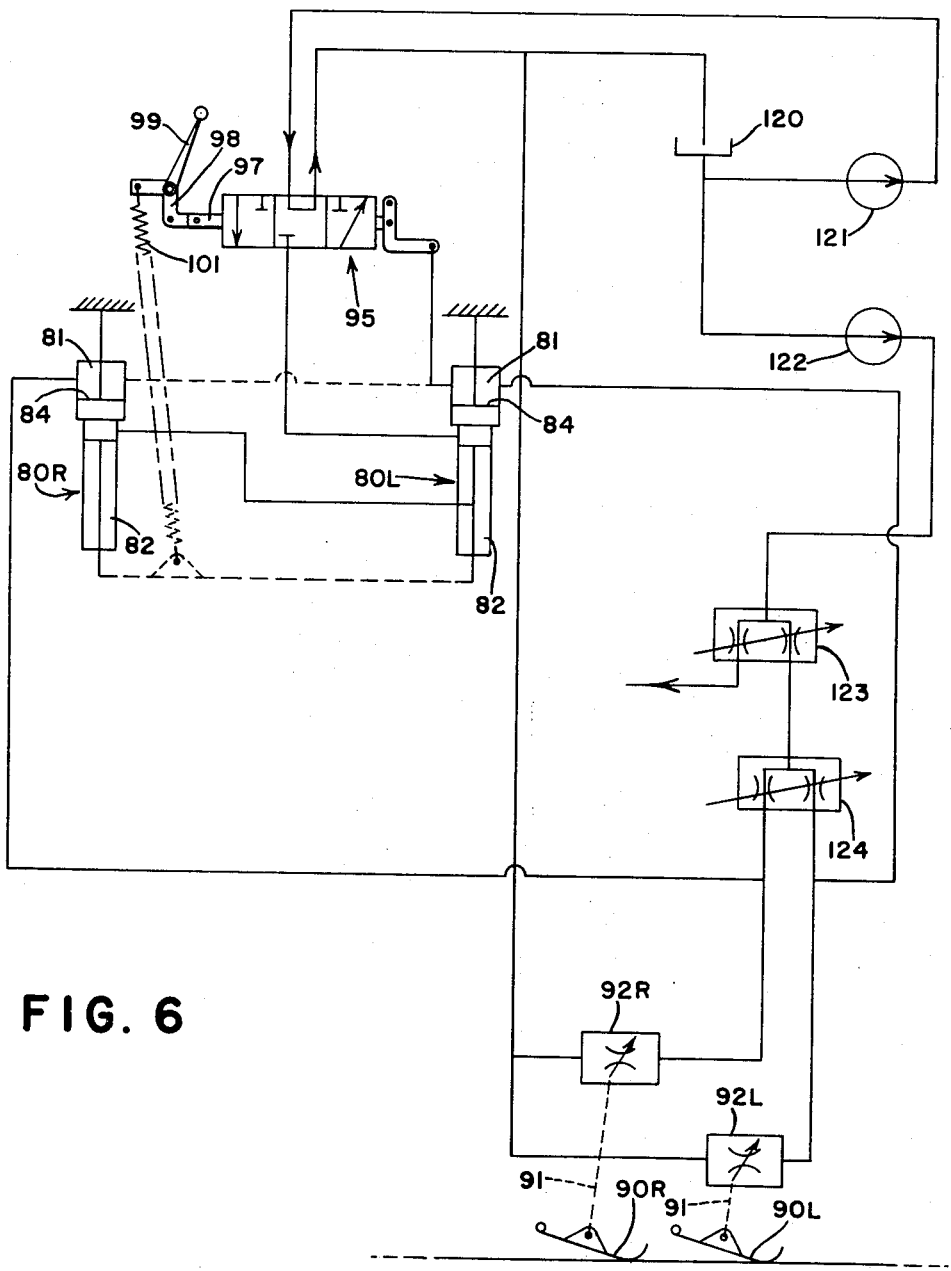
FIG. 6 is a schematic view of the height-sensing mechanism which operates to raise and lower the respective harvesting units.

Reviewing FIG. 6 with reference to the schematic diagram of the hydraulic system, fluid moves from the variable restrictor valves 92L, 92R to the large cylinder portion 81 of the left- and right-hand hydraulic cylinder devices 80L, 80R. In operation, the valves 92L, 92R operate to extend and retract cylinders 81 in accordance with the rise and fall respectively of the ground level beneath the respective shoes 90L, 90R. The shoes ride against the ground and upon engagement with high spots on the ground operate the respective valves 92L, 92R to extend the cylinders 81 on their respective rods. This causes the units 40, 41 to raise individually in accordance with the ground level. After the shoes have passed over the high spot, they will drop with respect to the units 40, 41 to again adjust the valves 92L, 92R and to thereby cause the units 40, 41 to lower. Thus, the position of the shoes 90L, 90R with respect to the units 40, 41 affects the extension and retraction of the cylinders 81 on their pistons and piston rods.

Figure 2:
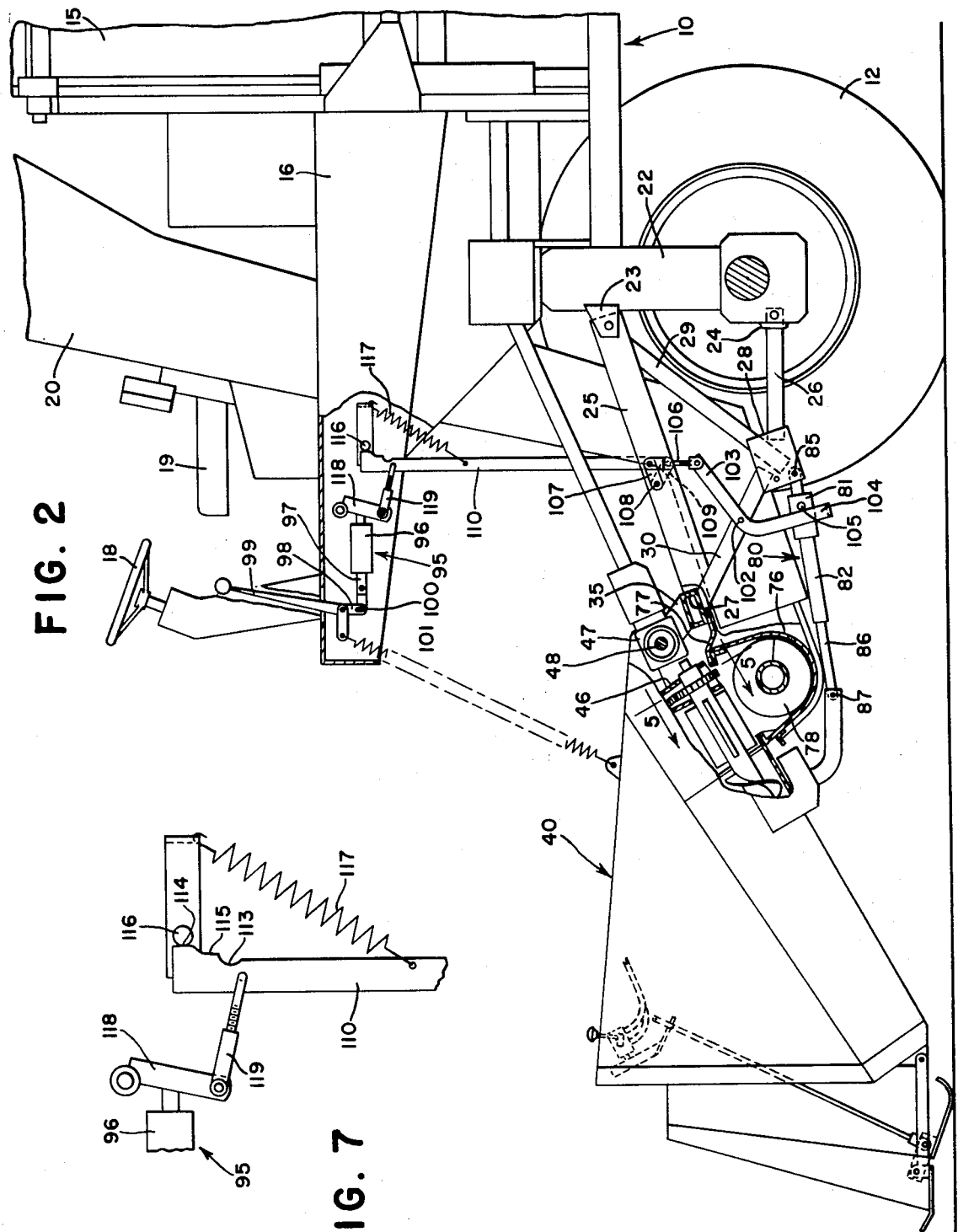
FIG. 2 is a side view, with portions broken away, showing the connections and supporting structure between the tractor and the forwardly positioned row units. For purposes of showing the linkages to the operator's station, the cab is removed from the station.

Referring to FIG. 2, there is provided a main control valve 95 having a valve housing 96 and a spool valve 97 extending through the housing. Connected to the forward end of the spool valve 97 is a bellcrank 98 with a vertically extending control lever 99. The bellcrank 98 has one leg connected to the spool valve 97 by means of a pin 100 that may move vertically in the leg of the bellcrank. The bellcrank 98 has a forwardly projecting arm or leg with a spring 101 connected thereto that extends downwardly to the row unit 41. The spring 101 operates to bias the valve 97 in a rearward direction.

Fixed to the diagonal brace 30 is a pivot pin 102 on which is mounted a bellcrank 103 having a lower bifurcated end 104 which fits on opposite sides of the enlarged rear cylinder 81. Projecting from the cylinder 81 are lugs 105 that bear against an edge of the bifurcated portion 104. The upper leg portion of the bellcrank 103 is connected to an adjustable link 106, the latter having an upper end connected to an arm 107 fixed to a transverse cross shaft 108. The shaft 108 extends completely across the mechanism. A like linkage to the bellcrank 103, the link 106 and arm 107 is provided for the right unit 41 and consequently either unit may operate to rock the shaft 108. The shaft 108 carries a second singular arm 109 on which is connected the lower end of a vertical link or strap 110 that projects upwardly to an upper end adjacent to but rearwardly of the main valve 96. The upper end of the link 110 has a recessed section 113 and a rearwardly projecting portion 114 that projects from the rear edge. An intermediate edge portion 115 extends between a projecting portion 114 and the recess 113 and acts with the recess 113 and portion 114 to provide a cam surface for purposes to be explained. Fixed to framework at the upper of the link 110 is a rod 116 that bears against the cam surface previously explained. The rod 116 is fixed to a bracket that extends rearwardly. A spring 117 extends between the rear end of the bracket 116 and a midportion of the link 110 and biases the cam surfaces against the rod 116. An arm 118 engages the rear end of the spool valve 97 and is pivotally carried on the support frame to swing fore and aft. An adjustable link 119 extends from the link 110 to the lower end of the arm 118 and consequently as the link 110 moves fore and aft, the arm 118 will readjust the main valve 95. Thus, as the lugs 105 on the rear cylinders 84 move fore and aft, there will be a direct bearing on the main valve 95.

Figure 3:
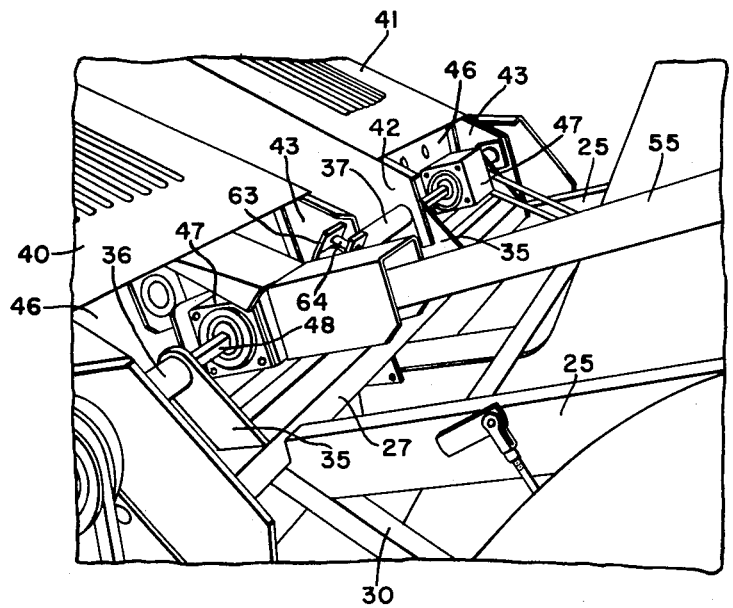
FIG. 3 is a perspective view taken from the side and slightly overhead which shows the mounting and driving structure for the row units.

Reference is now made to FIG. 3 with the schematic view of the hydraulic circuit means for the cotton harvester. A fluid level is maintained in a reservoir 120. Fluid moves from the reservoir through a large-capacity pump 121 and a low-capacity pump 122. Specifically, the large pump 121 has a capacity of about ten gallons per minute whereas the small pump 122 has a capacity of 4 gallons per minute. Fluid from the low-capacity pump 122 moves through a flow divider 123 and fluid is metered out from the divider 123 to a power steering hydraulic system, not shown, and to a second flow divider valve 124 which divides the movement of fluid equally between the primary left- and right-hand rear cylinders 81 of the left- and right-hand cylinder devices 80L and 80R. Fluid is also metered through the primary variable orifice valves 92L, 92R. The ground feelers 90L and 90R regulate the respective variable orifice valves 92L, 92R.

Fluid from the high-capacity pump 121 moves to the main valve 95 which may be shiftable to permit the fluid to return to reservoir or to retract the cylinders 82 for purposes of raising the respective harvesting units 40, 41.

The system operates as follows. Assuming the operator is entering a field and the units 40, 41 are in their transport position, which occurs when the hydraulic cylinders 82 are fully extended, the operator moves the control lever 99 to lower the harvesting units. The units lower until the sensing shoes 90L, 90R contact the ground which restricts the oil flowing through the restrictor valves 92L, 92R. The pressure build-up due to the restrictor valves causes the fluid to move into the cylinders 84 which actuates the control linkage 102-116. This causes the cam surfaces 113, 114, 115 to shift until the surface 115 moves against the bar 116 and the valve 97 is thereby shifted to neutral. The rod 116 will be retained in the neutral zone 115 in a more or less loss-motion position until the shoes 90L, 90R are raised or lowered sufficiently to actuate the linkage and shift the cam surfaces 113 or 114 into engagement with the rod 116. This will automatically create a movement of the valve spool 97 to a position in which the main valve 95 moves or raises or lowers the respective unit 40, 41 depending upon the message received from the shoes.

The operation of the hydraulic system is completely automatic. The operator merely moves the lever 99 to the raised or lowered position and the units adjust until the sensing shoes 90L, 90R require that the units stop. Thus, should a small obstruction be passed over, one or both of the shoes 90L, 90R will operate its respective valve 92L, 92R to raise the respective units 40, 41 until the shoes 90L, 90R pass over the obstructions and the valves 92L, 92R are adjusted. Therefore, for small obstructions or small depressions in the ground level, the units 40, 41 are adjusted by extending the rear cylinders 94 on their respective piston rods. Should the cylinders 94 be extended or retracted beyond what is considered the normal operating range which is when the rod 116 bears against the cam portion 115, the linkage extending from the cylinders 94 to the main valve 95 will adjust the spindle 97 and the entire harvesting unit 40 or 41 is raised to its transport position or lowered to its lowermost position.

Where it is desired to move the unit to a raised or transport position, the lever 94 is moved to the transport position. Since the spring 101 is connected to the unit 41, raising of the latter will remove tension in the spring. Also, raising of the unit 41 causes the ground feelers to drop and retract the cylinders 84 on their respective piston rods. Therefore, since there is no tension in the spring 101, the spring-loaded spool 97 will be shifted to its neutral position thereby permitting the operator to release the lever 94 when the units 40, 41 reach their transport positions.

We claim:

1. A positioning mechanism for a fore-and-aft elongated crop harvester in which the harvester has its rear portion pivotally mounted on a mobile support, said positioning mechanism comprising: a hydraulic piston and cylinder assembly extending between the frame and harvester and composed of a pair of rigidly joined and axially aligned first and second cylinders and pistons shiftable within the cylinders and having piston rods extending out of the cylinders to ends connected to the frame and harvester respectively, said first cylinder and its piston and said second cylinder and its piston being in low and high capacity respectively; a first valve connected to and for shifting the first cylinder on its respective piston; a main valve connected to and for shifting the piston with respect to the second cylinder; a ground surface feeler supported on the harvester for vertical movement and for shifting vertically with respect to the harvester in accordance with the rise and fall of the surface level; a connection between the feeler and first valve for adjusting the latter to thereby extend and retract the first cylinder on its piston in accordance with the rise and fall of the ground surface; a linkage connection between the piston and cylinder assembly and said main valve for adjusting the main valve and responsive to shifting of the first cylinder on its respective piston to shift the main valve.

2. The structure as set forth in claim 1 in which the linkage has lost motion therein to permit limited movement of the first cylinder on its piston without adjusting the main valve.

3. The structure as set forth in claim 1 in which the cylinder assembly has surface protrusions on at least one of its cylinders and the linkage extends to and is operatively connected to the protrusion.

4. The structure as set forth in claim 1 in which the first and second cylinders are end-to-end and rigidly joined and said first cylinder is considerably larger in diameter than said second cylinder.

5. The structure as set forth in claim 1 further characterized by a manually-controlled override means for said first valve.

6. A positioning mechanism for a fore-and-aft elongated crop harvester in which the harvester has its rear portion pivotally mounted on a mobile support, said positioning mechanism comprising: a hydraulic piston and cylinder assembly extending between the frame and harvester and composed of a pair of low and high capacity rigidly joined and axially aligned first and second cylinders and pistons shiftable within the cylinders and having piston rods extending out of the cylinders to ends connected to the frame and harvester respectively; first valve means connected to and for shifting the first cylinder on its respective piston; a main valve connected to and for shifting the piston with respect to the second cylinder; a ground surface feeler supported on the harvester for vertical movement and connected to the first valve for adjusting the latter to thereby extend and retract the first cylinder on its piston in accordance with the rise and fall of the ground surface; a connection between the piston and cylinder assembly and said main valve for adjusting the main valve and responsive to shifting of the first cylinder on its respective piston beyond a given range to shift the main valve.

7. The invention defined in claim 6 in which said connection between the piston and cylinder assembly and said main valve is a linkage that includes a lost-motion action that permits said first cylinder and its piston to move within the aforesaid given range without shifting the main valve.

* * * * *